United States Patent [19]

Ida et al.

[11] Patent Number: 4,730,116
[45] Date of Patent: Mar. 8, 1988

[54] SHEET THICKNESS MEASURING APPARATUS BY OPTICAL SCANNING

[75] Inventors: Yoshiaki Ida; Toshishige Nagao, both of Amagasaki, Japan

[73] Assignee: Mitsubishi Denki Kabushiki Kaisha, Tokyo, Japan

[21] Appl. No.: 886,782

[22] Filed: Jul. 18, 1986

[30] Foreign Application Priority Data

Aug. 6, 1985 [JP] Japan .................. 60-174609
Aug. 9, 1985 [JP] Japan .................. 60-176781
Sep. 20, 1985 [JP] Japan .................. 60-209436

[51] Int. Cl.$^4$ ............................. G01B 11/24
[52] U.S. Cl. ....................... 250/560; 356/376
[58] Field of Search ........... 250/560, 561; 356/376, 356/381, 382, 384–387; 377/53

[56] References Cited

U.S. PATENT DOCUMENTS

| | | | |
|---|---|---|---|
| 3,518,441 | 6/1970 | Selgin | 356/381 |
| 4,311,392 | 1/1982 | Yazaki et al. | 250/560 |
| 4,532,723 | 8/1985 | Kellie et al. | 356/385 |

FOREIGN PATENT DOCUMENTS

| | | |
|---|---|---|
| 56-604 | 1/1981 | Japan . |
| 56-150302 | 11/1981 | Japan . |
| 57-104807 | 6/1982 | Japan . |
| 57-161608 | 10/1982 | Japan . |

Primary Examiner—David C. Nelms
Assistant Examiner—Stephone B. Allen
Attorney, Agent, or Firm—Burns, Doane, Swecker & Mathis

[57] ABSTRACT

A thickness measuring apparatus of a sheet-like product, wherein the sheet to be measured is supported by being partly rounded around a shaft while an light shading plate is positioned so as to form a slit between the shaft and the shaft side edge of the light shading plate, is able to measure the sheet thickness directly by scanning the slit width with a light beam or indirectly by comparing the scanned results of the light beam of this slit with that of a reference slit provided at the light shading plate so that, for instance, the thickness of magnetic material coated on a magnetic tape can be measured continuously in the production line thereof.

27 Claims, 11 Drawing Figures

SHEET THICKNESS MEASURING APPARATUS BY OPTICAL SCANNING

BACKGROUND OF THE INVENTION

1. Field of the Invention

This invention relates to an apparatus suitable for measuring the thickness of sheet-like products such as magnetic tapes, particularly the thickness of the coating thickness on them.

2. Description of the Prior Art

Figure 1:
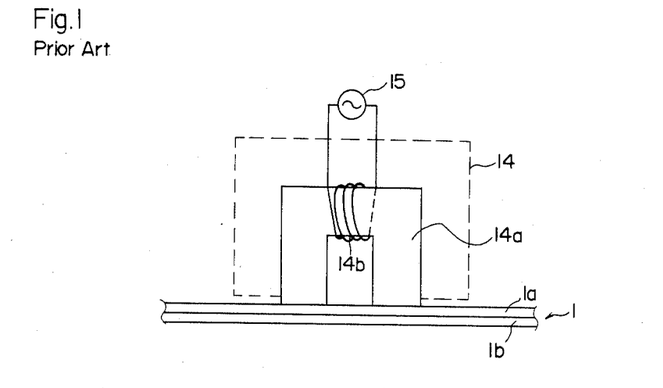
FIG. 1 is showing schematically a conventional, electric vortex current type sheet thickness measuring apparatus which is used to measure the thickness of magnetic material coated on a magnetic tape.

An apparatus utilizing electric vortex current as shown in FIG. 1 is already known for measuring the thickness of sheet-like products such as audio tapes, video tapes, etc., particularly the thickness of magnetic materials as a coating coated on the tape-like supports thereof made of polyester and other plastics.

In FIG. 1, reference numeral 1 designates a magnetic tape, in which tape-like support layer 1a made of transparent polyester and others is provided with a coating layer 1b of magnetic materials coated on a predetermined surface thereof, while 14 is a detector comprising an iron core 14a with one open end, which is wound around by exciting coil 14b connected with an oscillator 15.

Now the functions of the apparatus will be described. Referring to FIG. 1, when the oscillator 15 is excited by the exciting coil 14b, magnetic field due to the exciting coil 14b is generated in the open end of the iron core 14a. Therefore, the exciting impedance fluctuates when a coating layer 1b, namely, magnetic material takes an adjacent position as shown, since fluctuation of the exciting impedance depends upon characteristics, sizes (width, thickness), position, etc., of the magnetic material, the coating thickness of the magnetic material, i.e., the coating layer 1b can be measured by detecting the impedance fluctuation under the predetermined condition of the characteristics of the magnetic material, as well as the width and the position thereof.

It is difficult for the conventional apparatus with the construction mentioned above to measure reliably the thickness of the coating layer if the distance between the coating layer and the detector can't be kept constant and narrow, therefore, the conventional apparatus has a disadvantage in that it is practically difficult to be installed in production lines.

On the other hand, an optical micrometer is also known, wherein light beams such as laser beams are utilized with the body thereof positioned relatively apart from the object whose thickness is to be measured. By using such apparatus, it is possible to measure the thickness after coating the magnetic material and then determine the coating thickness when the tape-like support layer thereof is controlled at a constant thickness.

Examples of such measuring apparatus are disclosed in U.S. Pat. No. 4,082,463 as well as Japanese Patent Laid Open Nos. 57-161,608 (1982) and 57-104,807 (1982), wherein the construction shown in FIG. 2 is adopted principally.

Figure 2:
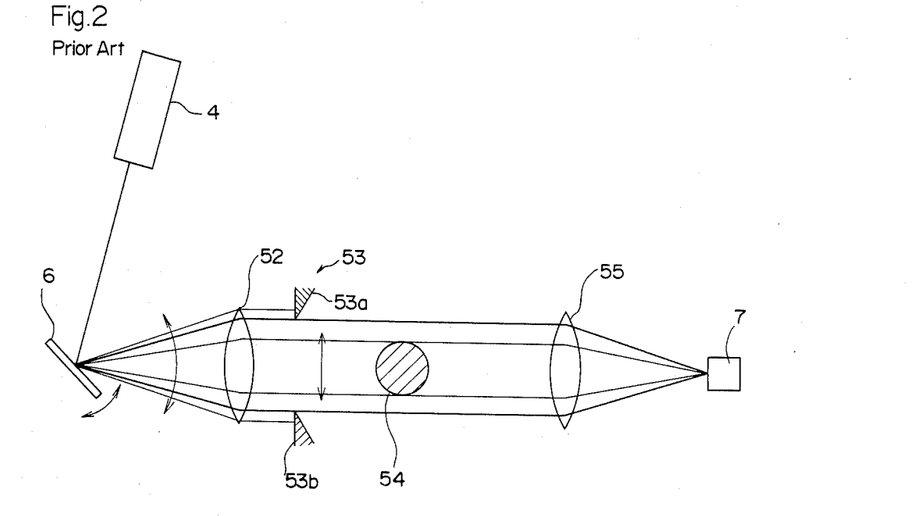
FIG. 2 is showing schematically a conventional optical micrometer applicable also as the sheet thickness measuring apparatus.

Referring to FIG. 2, reference numeral 6 is a scanner such as polygonal mirror and a light beam from a light source 4 is scanned upward and downward onto a first lens 52, which irradiates a parallel beam onto a second lens 55, while the parallel beam reaches the second lens 55, through a gate 53 comprising iris or restrictors 53a, 53b and collected by a receiving surface of a photoelectric converter 7. Therefore, when the light beam is scanned at a constant speed from the scanner 6 onto the first lens 52, the photoelectric converter 7 receives the light beam travelling up and down in the span of the gate 53.

An object 54 to be measured is positioned between the first and second lenses 52, 55, therefore, the photoelectric converter 7 doesn't receive any light beam which remains in a travelling route covered by the vertical dimension of the object 54 to be measured. The vertical direction (a distance between the iris or restrictor 53a and another restrictor 53b) thereof being known, it is possible to measure the vertical (on the FIG. 2) dimension of the object 54 if the time interval from initial incidence of the light beam onto the photoelectric converter 7 to the interruption thereof, the time interval of the interruption and the time interval from reincidence of the light beam to the reinterruption thereof can be detected respectively.

Figure 3:
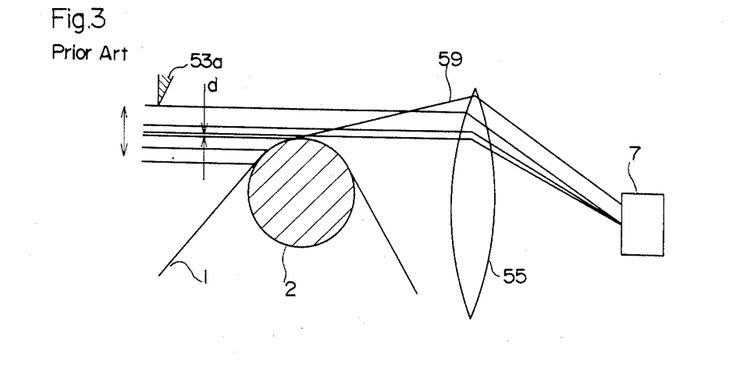
FIG. 3 is an operation illustration thereof.

Moreover in such apparatus, as shown in FIG. 3, the object 54 to be measured is substituted with a shaft, which supports a magnetic tape by being partly rounded with ascending thereonto and then descending therefrom, so that a clearance between the upper iris or the restrictor 53a and the top surface of the magnetic tape 1 supported by the shaft 2 can be measured. However, such apparatus has the following disadvantage for some configuration and reflectance of the object to be measured (the magnetic tape 1 in this case), for instance, if the magnetic tape 1, the object to be measured is cylindrical with high surface reflectance and the light beam is projected upon a part (as identified by "d") near to the top cylinder-shaped part of the magnetic tape, the reflection 59 thereof is projected upon the light receiver 7.

Therefore, in spite of the actual presence of the magnetic tape 1 as the object to be measured, the light receiver 7 gives the detection result as if the magnetic tape 1 is not present. Moreover, the aforementioned influences of the reflected light beam depend upon the configuration of the object to be measured (the curvature difference of the magnetic tape 1 due to the diameter difference of the shaft 2), the surface reflectance thereof, etc., resulting in difficult error compensation.

SUMMARY OF THE INVENTION

This invention aimed to solve the aforementioned difficulties. The main object of this invention is to provide a sheet thickness measuring apparatus, which can continuously measure with non-contact and high precision the thickness of a sheet-like product such as magnetic tape during the production process thereof.

The sheet thickness measuring apparatus of this invention comprising a light beam source, a shaft for supporting a sheet which partly rounds around the shaft and whose thickness is to be measured, a light shading plate positioned on a plane including the central axis of the shaft and passing through the contact area between the surface of the shaft and the sheet to be measured, and forms a slit of a predetermined width between the surface of the shaft and the shaft side edge thereof, a scanning apparatus including a scanner for scanning at a constant speed a light beam irradiated from the light beam source toward the slit on a plane which crosses the sheet supported by the shaft and to be measured, and a photoelectric conversion device which receives the light beam through the slit, converts it into electric signals and outputs them, a timer for measuring the signal outputting duration of the photoelectric conversion device, and an arithmetic means which detects the clearance between the surface of the sheet supported by the shaft and to be measured and the shaft side edge of the light shading plate on the basis of measuring result by the timer and the scanning speed of the light beam by the scanning apparatus and determines the sheet thickness by subtracting the detected result from the slit width.

The above and further objects and features of the invention will more fully be apparent from the following detailed description with accompanying drawings.

DESCRIPTION OF THE PREFERRED EMBODIMENTS

The sheet thickness measuring apparatus of the invention will be described in detail with reference to the drawings attached.

Figure 4:
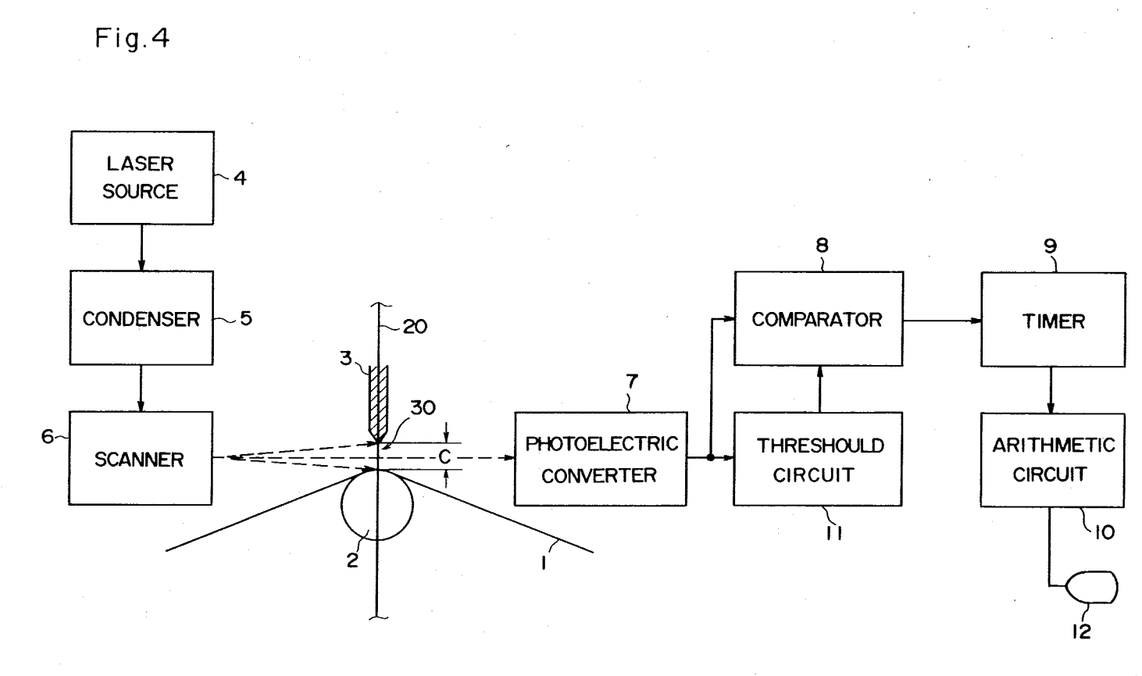
FIG. 4 is a block diagram showing first embodiment of the sheet thickness measuring apparatus of the invention.

In FIG. 4 showing the block diagram for first embodiment of this invention, wherein reference numeral 1 is a sheet such as magnetic tape, whose thickness should be measured. This sheet 1 is kept under tension with an appropriate force which tends to push the sheet 1 upward from the shaft 2. A light shading plate 3 is positioned on a plane (the cross section thereof being identified by reference numeral 20 in FIG. 4), which includes the central axis of the shaft 2 and passes through the contact area of the shaft 2 with the sheet 1. The edge of the light shading plate 3 facing the shaft 2 is positioned at a predetermined distance in parallel with the surface of the shaft 2, resulting in that a slit 30 of predetermined width C between them is formed.

A laser beam irradiated from the laser source 4 is condensed by the condenser 5 and transmitted as a light beam to the scanner 6, which scans the laser beam so that it traverses across the aforementioned slit 30 from the light shading plate 3 to the shaft 2 (or vice versa), by making a single plane or polygonal mirror revolve.

The photoelectric converter 7 for converting the received laser beam into an electric signal output is positioned facing the scanner 6 through the slit 30. The output signal of the photoelectric converter 7 is transmitted to the comparator 8 and the threshold circuit 11, which calculates the maximum output (available when the laser beam from the scanner 6 passes perfectly through the slit 30 and then received by the photoelectric converter 7) and the minimum value (available when no laser beam from the scanner 6 is received by the photoelectric converter 7) therefrom and transmits the average value as a threshold value to the comparator 8.

According to the aforementioned threshold value from the threshold circuit 11, the comparator 8 converts the output signal of the photoelectric converter 7 into a rectangular waveform, which is outputted to a timer 9.

The timer 9 counts the pulse width of the rectangular waveform outputted from the comparator 8 and acts as a timer which measures the outputting duration of the rectangular waveform, in other words, the receiving time duration of laser beam by the photoelectric converter 7. The output of the timer 9 is transmitted to the arithmetic circuit 10, which converts the output of the converter 9 according to a predetermined mathematical relationship or a conversion table. The thickness of the sheet 1 as the result of subtracting the converted value by the arithmetic circuit 10 from the width C is displayed at a display unit 12. The sheet 1 is transferring at a predetermined constant speed while the shaft 2 is driven at the synchronized speed.

Now the functions of the apparatus of the invention abovementioned will be described. The laser beam irradiated from the laser source 4 is condensed and focused at the slit 30 and scanned by the scanner 6 so that the laser traverse across the slit 30 from the light shading plate 3 to the shaft 2. Therefore, the photoelectric converter 7 receives the laser beam only when the laser beam from the scanner 6 is scanning within the slit 30. The scanning time duration can be detected by the presence duration of output signals from the timer 9, while the scanning speed of the laser beam and the distance between the scanner 6 and the photoelectric converter 7 being predetermined, the counting result corresponding to the width C of the slit 30 is outputted to the arithmetic circuit 10 from the timer 9.

However, the sheet 1 is actually positioned on the surface of the shaft 2 within the slit 30, therefore, the time counting value transmitted to the arithmetic circuit 10 corresponds to the value B (see FIG. 5) equal to the width C of the slit 30 subtracted by the thickness of the sheet 1, which is converted by the arithmetic circuit 10 and subtracted from the width C of the slit 30 so that the thickness of the sheet 1 is finally obtained. The thickness of the sheet 1 is displayed by the display unit 12.

If the coating thickness of magnetic material coated on the magnetic tape should be measured, it is enough to simply subtract the thickness of the support material of the magnetic tape 1 from the value determined and displayed by the arithmetic circuit 10 and display unit 12.

Figure 5:
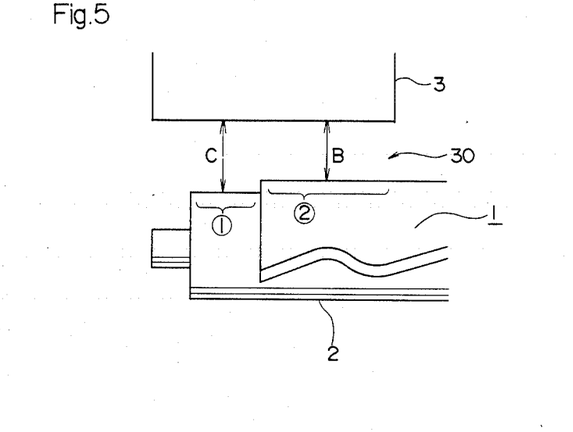
FIGS. 5, 6 are operation illustrations thereof.

The measuring error due to certain eccentricity of the shaft 2 can be avoided by using a measuring method shown in FIG. 5, wherein two laser beams are scanned separately, a part ② where the sheet 1 being present and another part ① where the sheet 1 being absent, in order to process to determine the difference thereof and consequently obtain the thickness of the sheet 1. Therefore, the apparatus is so constructed that the laser beam is divided by a diffraction grating or a prism at an arbitrary position up to the scanner 6 and projected onto the same scanner 6. As an alternative, the system parts following the photoelectric converter 7 are positioned in two circuits and the output signals of two timers 9, 9 are processed by the arithmetic circuit 10.

Figure 6:
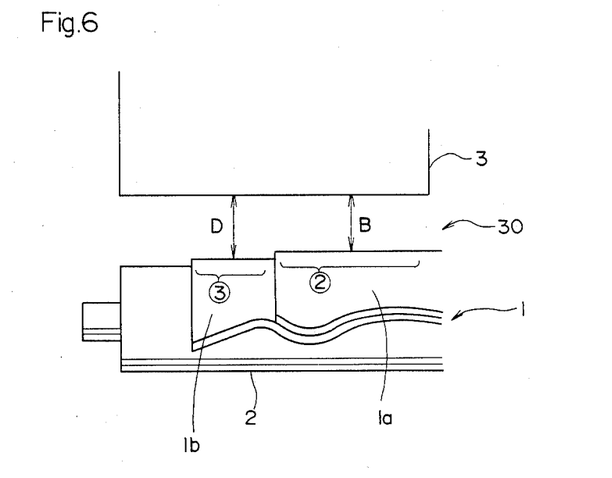

When the surface of the sheet 1, whose thickness to be measured, is coated not completely but only partly and the supported layer 1b is exposed, two laser beams are scanned the clearance B of a part ② of a coating layer 1a and the clearance D of a part ③ where the support layer 1b is exposed respectively as shown in FIG. 6. Then a thickness of coating layer 1a of sheet 1 is measured directly by as same as above mentioned process.

Figure 7:
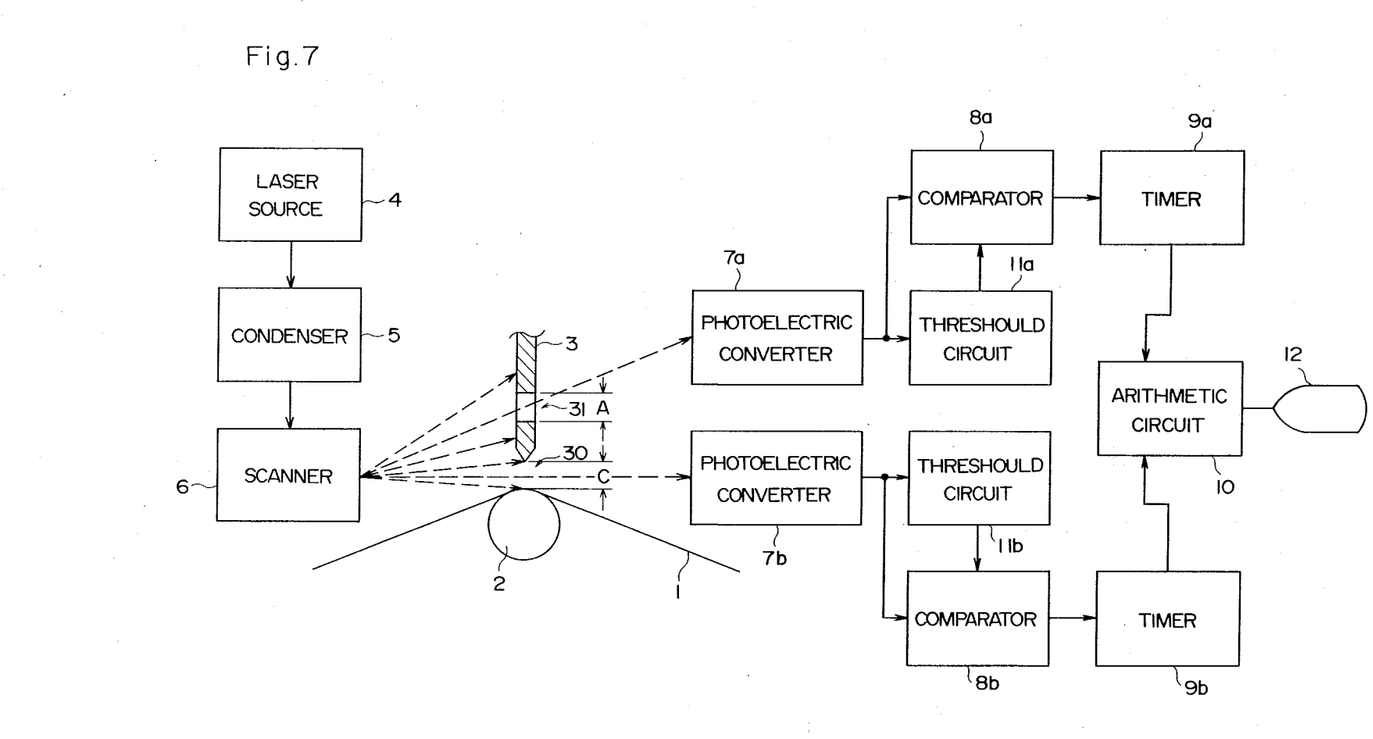
FIG. 7 is a block diagram showing second embodiment of the sheet thickness measuring apparatus of the invention.
Figure 8:
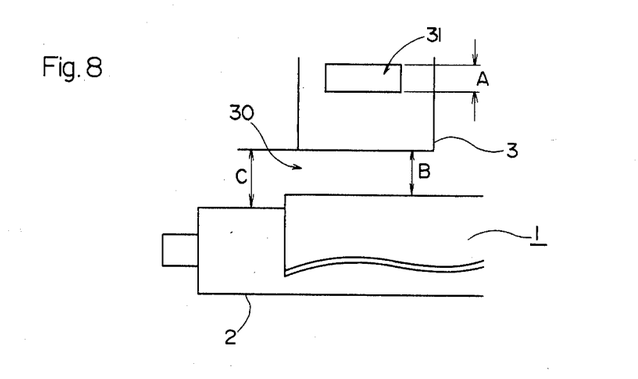
FIG. 8 is an operation illustration thereof.

Now, second embodiment of this invention will be described with reference to the block diagram in FIG. 7 and the schematic drawing in FIG. 8. The reference numerals 1, 2, 3, 4, 5, 6, 10, 12 and 30 designate the same aforementioned parts shown in FIG. 4, while the reference numerals 7a, 7b; 8a, 8b; 9a, 9b and 11a, 11b in FIGS. 6 and 7 correspond to the reference numerals 7, 8, 9 and 11 of the first embodiment shown in FIG. 4.

In this embodiment, the light shading plate 3 is provided with the slit (hereinafter called as reference slit) of a predetermined width A, which is extended in parallel with the surface (centerline) of the shaft 2. Similarly to the embodiment of FIG. 4, there are 2 circuit consisting of the photoelectric converters 7a, 7b; the threshold circuits 11a, 11b; the comparators 8a, 8b and the timers 9a, 9b, while the output signals of the timers 9a, 9b are transmitted to the arithmetic circuit 10.

Now the functions of the aforementioned second embodiment will be described, wherein the distance between the light shading plate 3 and the shaft 2, i.e., the width of the slit 30 is defined as C. In this second embodiment, the laser beams through the reference slit 31 and the slit 30 are received by the photoelectric converter 7a and 7b respectively. FIG. 8 is a graph showing the received light amounts of the both photoelectric converters 7a and 7b.

Figure 9:
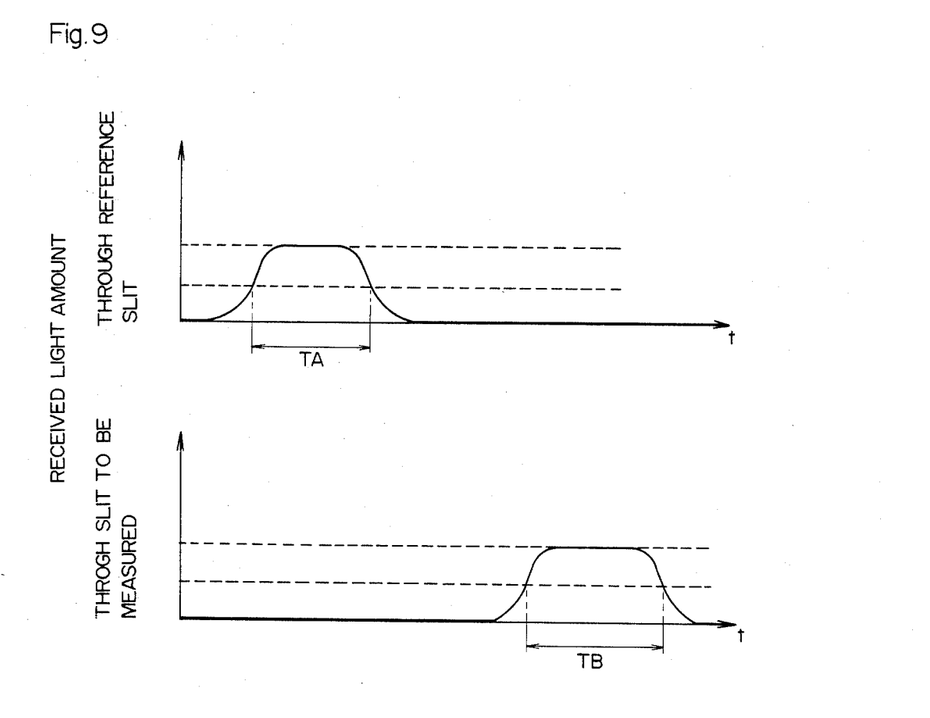
FIG. 9 is a diagram showing the received light amount of the photoelectric converter.

When the laser beam begins to enter the reference slit 31 (or the slit 30) from the upper edge thereof, the received light amount of the photoelectric converter 7a (or 7b) increases from the initial 0 value, retains the maximum value during the time duration when the whole laser beam is passing through, then decreases slowly when the laser beam comes to the lower edge of the reference slit 31 (or the top part of the sheet 1) and finally becomes 0 when the laser beam is perfectly out of the reference slit 31 (or the slit 30). TA and TB in FIG. 9 are showing the times measured by the timers 9a and 9b with respect to the threshold value as reference determined by the threshold circuits 11a and 11b respectively.

If it is supposed the traversing speed of the light beam on the light shading plate 3 is V, $$TA = \frac{A}{V} \quad (1)$$

$$TB = \frac{B}{V} \quad (2)$$

Therefore, from the above equations (1) and (2), $$\frac{TB}{TA} = \frac{B}{A}$$

and finally, $$B = A \cdot \frac{TB}{TA} \quad (3)$$

where A, the width of the reference slit 31 is known, so B can be determined independently from the traversing speed V of the laser beam.

Moreover, the width C of the slit 30 is known, so the thickness X of the sheet 1 is obtained from the following equation (4).

$$X = C - B \quad (4)$$

The above calculation is processed by the arithmetic circuit 10 and the calculated thickness X of the sheet 1 is displayed on the display unit 12.

Then, the scanning apparatus consisting of the scanner 6 and the photoelectric converter 7 (7a, 7b) will be described.

Figure 10:
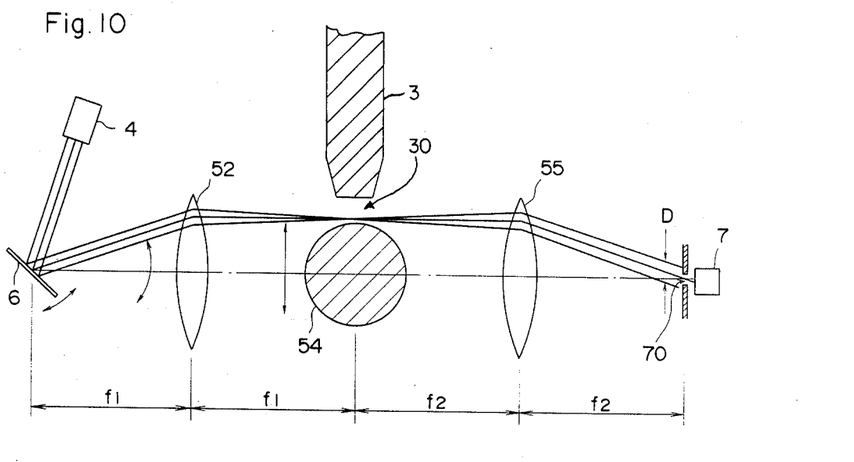
FIG. 10 is showing shematically a construction of the scanning apparatus of the invention.

FIG. 10 shows schematically the construction of the scanning apparatus of the sheet thickness measuring apparatus of the invention, wherein reference numeral 4 is the light source (or the condenser), 6 is the scanner (revolving mirror, etc.), 52 is a first lens, 54 is an object to be measured, 55 is a second lens, 7 is the light receiving device (or the photoelectric converter) and 70 is the light receiving slit provided at the light receiving surface of the photoelectric converter 7 and designed as a narrow rectangular form perpendicular to the traversing direction of the laser beam. The light receiving surface of the photoelectric converter 7 receives only the laser beam passed through the light receiving slit 70.

In FIG. 10, $f_1$ and $f_2$ are showing the focal distances of the first and second lenses 52 and 55 respectively. As shown in FIG. 10, the center of the scanner 6 is positioned at the front focal point of the first lens 52 and the object 54 to be measured (strictly speaking the point thereof to be measured) is positioned at the back focal point of the first lens 52 and the front focal point of the second lens 55, while the light receiving slit 70 is positioned at the back focal point of the second lens 55.

Then, the operations of the apparatus will be described. The parallel laser beam from the laser source 4 is angle-scanned by the scanner 6 and projected onto the first lens 52. The reflection surface center of the scanner 6 being positioned at the front focal point of the first lens 52, the angle-scanned light beam as condensed through the first lens 52 is scanned in parallel with the light axis thereof. The received light amount is rapidly changed by traversing across the object 54 to be measured, resulting in the improved detecting precision, because the object 54 to be measured is positioned at the back focal point of the first lens 52 and the beam diameter is condensed to minimum thereon.

The light beam is projected onto the second lens 55 after scanning the object 54 to be measured. The front focal point of the second lens 55 is positioned at the back focal point of the first lens 52 and the light beam passed through the second lens 55 becomes again a parallel beam. The light receiving slit 70 is positioned at the back focal point of the second lens 55, so that the parallel beam is passed through with restriction of the width in the axial direction parallel with the traversing direction thereof and then received by the photoelectric converter 7.

Figure 11:
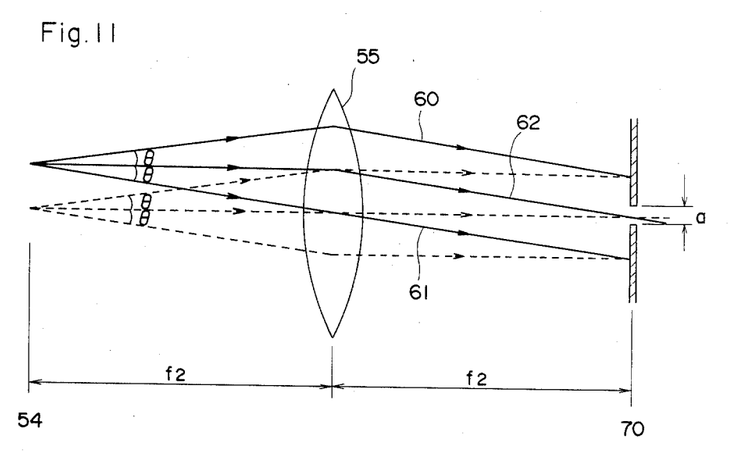
FIG. 11 is an operation illustration thereof.

The function of this light receiving slit 70 will be described with reference to FIG. 11, wherein the left end is showing the position of the object 54 to be measured. As described previously, the light beam scanning the object 54 to be measured is reflected from the surface at the end part thereof, producing the beam component with an angle θ larger than the original divergence angle of the beam. The light beams reflected from the top and bottom part of the object 54 to be measured follow the beam trajectories 60 and 61 respectively. These beams 60 and 61 are collimated to be in parallel with the center light 62 through the second lens 55, but take positions deviated upward and downward from the light axis at the back focal point of the second lens 55. If the light receiving slit 70 is provided at the back focal point of the second lens 55 so as to make only the light in the range of minute width a near to the light axis pass through, the light reflected from the object surface is interrupted almost perfectly and unable to reach the light receiving surface of the photoelectric converter 7. As this phenomenon takes place at any position when the object is perpendicular to the light axis, the reflected light in the whole scanning range is interrupted by the light receiving slit 70. Therefore almost all reflected light harmful for detecting peripheries of the object to be measured is removed in this scanning apparatus and the necessary center light only is received by the light receiving surface of the photoelectric converter 7, resulting in the exact measurement realized.

According to this invention as described above, the thickness of any sheet-like product can be measured with high precision in a non-contact condition. It is also possible to measure the thickness of magnetic material coated on magnetic tapes, continuously in the production lines thereof.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A sheet thickness measuring apparatus comprising:
   a light beam source,
   a shaft for supporting a sheet which is partly wound around said shaft and whose thickness is to be measured,
   a light shading plate positioned on a plane including the central axis of said shaft and passing through the contact area between the surface of said shaft and the sheet to be measured, and forming a slit of a predetermined width between the surface of said shaft and a side edge of the plate,
   a scanning apparatus including a scanner for scanning at a constant speed, a light beam irradiated from said light beam source toward said slit on a plane which crosses, within said slit, the sheet supported by said shaft and to be measured, and a photoelectric conversion device which receives the light beam through said slit, converts it into electric signals and outputs them,
   a timer for measuring the signal outputting duration of said photoelectric conversion device, and
   an arithmetic means which detects the clearance between the surface of the sheet supported by said shaft and to be measured, and the side edge of said light shading plate, on the basis of the measuring result by said timer and the scanning speed of the light beam by said scanning apparatus, and determines the sheet thickness by subtracting the detected result from said slit width.

2. A sheet thickness measuring apparatus as set forth in claim 1, wherein said scanning apparatus comprises a light receiving slit at the light receiving surface of said photoelectric conversion device, of an appropriate width in the longitudinal direction crossing at right angle with the scanning direction of the light beam and said scanner is positioned at the front focal point of a first lens, said shaft is positioned at the back focal point of said first lens and also at the front focal point of a second lens, and said light receiving slit is positioned at the back focal point of said second lens respectively so that the light beam is projected through said light receiving slit onto the photoelectric conversion device.

3. A sheet thickness measuring apparatus as set forth in claim 1, wherein said timer measures the outputs of said photoelectric conversion device which are converted into rectangular waveforms by using the mean value of the maximum and minimum outputs thereof as a threshold value.

4. A sheet thickness measuring apparatus as set forth in claim 1, wherein rotating speed of said shaft is controlled corresponding to the transferring speed of the sheet whose thickness is to be measured.

5. A sheet thickness measuring apparatus as set forth in claim 1, wherein said light beam is a coherent light.

6. A sheet thickness measuring apparatus as set forth in claim 5, wherein said coherent light is a laser beam.

7. A sheet thickness measuring apparatus comprising:
   a light beam source, which irradiates at least two light beams,
   a shaft for supporting a sheet which is partly wound around said shaft and whose thickness is to be measured,
   a light shading plate positioned on a plane including the central axis of said shaft and passing through the contact area between the surface of said shaft and the sheet to be measured, and forming a slit of a predetermined width between the surface of said shaft and a side edge of the plate,
   a scanning apparatus including a scanner for scanning at a constant speed, one of two light beams irradiated from said light beam source toward said slit on a plane which crosses, within said slit, the sheet supported by said shaft and to be measured, and the other one toward said slit on another plane which crosses, within said slit, said shaft at a portion of not supporting the sheet to be measured, and a photoelectric conversion device which receives the light beam through said slit, converts it into electric signals and outputs them,
   a timer for measuring the signal outputting duration of said photoelectric conversion device, and
   an arithmetic means which detects the clearance between the surface of the sheet supported by said shaft and to be measured, and the side edge of said light shading plate, and the clearance between the surface of said shaft and the shaft side edge of said light shading plate, on the basis of the measuring result by said timer and the scanning speed of the light beam by said scanning apparatus, and determines the sheet thickness by calculating the difference of said both clearances.

8. A sheet thickness measuring apparatus as set forth in claim 7, wherein said scanning apparatus comprises a light receiving slit at the light receiving surface of said photoelectric conversion device, of an appropriate width in the longitudinal direction crossing at right angle with the scanning direction of the light beam and said scanner is positioned at the front focal point of a first lens, said shaft is positioned at the back focal point of said first lens and also at the front focal point of a second lens, and said light receiving slit is positioned at the back focal point of said second lens respectively so that the light beam is projected through said light receiving slit onto the photoelectric conversion device.

9. A sheet thickness measuring apparatus as set forth in claim 7, wherein said timer measures the outputs of said photoelectric conversion device which are converted into rectangular waveforms by using the mean value of the maximum and minimum outputs thereof as a threshold value.

10. A sheet thickness measuring apparatus as set forth in claim 7, wherein rotating speed of said shaft is controlled corresponding to the transferring speed of the sheet whose thickness is to be measured.

11. A sheet thickness measuring apparatus as set forth in claim 7, wherein said light beam source irradiates two light beams by branching one light beam.

12. A sheet thickness measuring apparatus as set forth in claim 7, wherein said light beam is a coherent light.

13. A sheet thickness measuring apparatus as set forth in claim 12, wherein said coherent light is a laser beam.

14. A sheet thickness measuring apparatus comprising:
- a light beam source, which irradiates at least two light beams,
- a shaft for supporting a sheet which is partly wound around said shaft and whose coating thickness is to be measured,
- a light shading plate positioned on a plane including the central axis of said shaft and passing through the contact area between the surface of said shaft and the sheet whose sheet thickness is to be measured, and forming a slit of a predetermined width between the surface of said shaft and a side edge of the plate,
- a scanning apparatus including a scanner for scanning at a constant speed, one of two light beams irradiated from said light beam source toward said slit on a plane which crosses, within said slit, the sheet at a coating portion supported by said shaft, and the other one toward said slit on another plane which crosses, within said slit, the sheet at a non-coating portion, and a photoelectric conversion device which receives the light beam through said slit, converts it into electric signals and outputs them,
- a timer for measuring the signal outputting duration of said photoelectric conversion device, and
- an arithmetic means which detects the clearance between the surface of the coating portion of the sheet supported by said shaft and the side edge of said light shading plate, and the clearance between the surface of the non-coating portion of the sheet and the side edge of said light shading plate, on the basis of the measuring result by said timer and the scanning speed of the light beam by said scanning apparatus, and determines the coating thickness by calculating the difference of said both clearances.

15. A sheet thickness measuring apparatus as set forth in claim 14, wherein said scanning apparatus comprises a light receiving slit at the light receiving surface of said photoelectric conversion device, of an appropriate width in the longitudinal direction crossing at right angle with the scanning direction of the light beam and said scanner is positioned at the front focal point of a first lens, said shaft is positioned at the back focal point of said first lens and also at the front focal point of a second lens, and said light receiving slit is positioned at the back focal point of said second lens respectively so that the light beam is projected through said light receiving slit onto the photoelectric conversion device.

16. A sheet thickness measuring apparatus as set forth in claim 14, wherein said timer measures the outputs of said photoelectric conversion device which are converted into rectangular waveforms by using the mean value of the maximum and minimum outputs thereof as a threshold value.

17. A sheet thickness measuring apparatus as set forth in claim 14, wherein rotating speed of said shaft is controlled corresponding to the transferring speed of the sheet whose thickness is to be measured.

18. A sheet thickness measuring apparatus as set forth in claim 14, wherein said light beam source irradiates two light beams by branching one light beam.

19. A sheet thickness measuring apparatus as set forth in claim 14, wherein said light beam is a coherent light.

20. A sheet thickness measuring apparatus as set forth in claim 19, wherein said coherent light is a laser beam.

21. A sheet thickness measuring apparatus comprising:
- a light beam source,
- a shaft for supporting a sheet which is partly wound around said shaft and whose thickness is to be measured,
- a light shading plate having a reference slit of reference width extending parallel to the axial direction of said shaft, positioned on a plane including the central axis of said shaft and passing through the contact area between the surface of said shaft and the sheet to be measured, and forming a slit of a predetermined width between the surface of said shaft and a side edge of the plate,
- a scanning apparatus including a scanner for scanning at a constant speed, a light beam irradiated from said light beam source toward said slit of predetermined width and said reference slit on a plane which crosses said reference slit and within said slit of predetermined width, the sheet supported by said shaft and to be measured, and photoelectric conversion devices which receive the light beams through said slit of predetermined width and said reference slit, convert them into electric signals and output them respectively,
- timers for measuring the signal outputting duration of said photoelectric conversion devices respectively, and
- an arithmetic means which determines the sheet thickness on the basis of the ratio of the measuring result by said timers and said reference slit width.

22. A sheet thickness measuring apparatus as set forth in claim 21, wherein said scanning apparatus comprises a light receiving slit at the light receiving surface of said photoelectric conversion device, of an appropriate width in the longitudinal direction crossing at a right angle with the scanning direction of the light beam and said scanner is positioned at the front focal point of a first lens, said shaft is positioned at the back focal point of said first lens and also at the front focal point of a second lens, and said light receiving slit is positioned at the front focal point of second lens and the back focal point of the second lens so that the light beam is projected through said light receiving slit onto the photoelectric conversion device.

23. A sheet thickness measuring apparatus as set forth in claim 21, wherein said timer measures the outputs of said photoelectric conversion device which are converted into rectangular waveforms by using the mean value of the maximum and minimum outputs thereof as a threshold value.

24. A sheet thickness measuring apparatus as set forth in claim 21, wherein rotating speed of said shaft is controlled corresponding to the transferring speed of the sheet whose thickness is to be measured.

25. A sheet thickness measuring apparatus as set forth in claim 21, wherein said light beam is a coherent light.

26. A sheet thickness measuring apparatus as set forth in claim 25, wherein said coherent light is a laser beam.

27. An apparatus which scans a parallel light beam irradiated from a light beam source through a scanner, makes the diameter of light beam condense by passing first lens and scan an object to be measured, and detects an edge of the object to be measured on the basis of output of a photoelectric conversion device converting photoelectrically the light beam being passed through a second lens after scanning of the object to be measured, wherein said photoelectric conversion device is provided with a light receiving slit at the light receiving surface thereof with an appropriate width in the longitudinal direction crossing at a right angle with the scanning direction of the light beam and said scanner is positioned at the front focal point of said first lens, said object is positioned at the back focal point of said first lens and at the front focal point of said second lens and said light receiving slit is positioned at the back focal point of said second lens so that the light beam is projected through said light receiving slit onto the photoelectric conversion device.

* * * * *